United States Patent
Roth

(10) Patent No.: US 9,631,482 B2
(45) Date of Patent: Apr. 25, 2017

(54) METHOD AND APPARATUS FOR DOWN-HOLE ALIGNMENT OF OPTIC FIBERS

(71) Applicant: Saudi Arabian Oil Company, Dhahran (SA)

(72) Inventor: Brian A. Roth, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 712 days.

(21) Appl. No.: 14/062,083

(22) Filed: Oct. 24, 2013

(65) Prior Publication Data

US 2015/0114624 A1     Apr. 30, 2015

(51) Int. Cl.

| | | |
|---|---|---|
| *E21B 47/12* | (2012.01) | |
| *E21B 33/038* | (2006.01) | |
| *E21B 17/02* | (2006.01) | |
| *G02B 23/24* | (2006.01) | |
| *H01R 13/631* | (2006.01) | |
| *G02B 6/35* | (2006.01) | |
| *G02B 6/42* | (2006.01) | |

(52) U.S. Cl.
CPC ............ *E21B 47/12* (2013.01); *E21B 17/023* (2013.01); *E21B 17/028* (2013.01); *E21B 33/0385* (2013.01); *E21B 47/123* (2013.01); *G02B 23/2476* (2013.01); *G02B 6/3574* (2013.01); *G02B 6/3588* (2013.01); *G02B 6/4225* (2013.01); *G02B 6/4227* (2013.01); *H01R 13/6315* (2013.01)

(58) Field of Classification Search
CPC ...... E21B 47/12; E21B 47/123; E21B 17/023; E21B 17/028; E21B 33/0385; G02B 7/005; G02B 6/4225; G02B 6/3588; G02B 6/3574; G02B 6/4227; H01R 13/6315

See application file for complete search history.

(56) References Cited

U.S. PATENT DOCUMENTS

| | | |
|---|---|---|
| 4,204,744 A | 5/1980 | Wittmann |
| 4,474,423 A | 10/1984 | Bisbee et al. |
| 4,720,163 A | 1/1988 | Goodwin et al. |
| 4,896,935 A | 1/1990 | Lee |
| 4,946,236 A | 8/1990 | Dautartas et al. |
| 5,035,482 A | 7/1991 | Ten Berge et al. |
| 5,261,015 A | 11/1993 | Glasheen |
| 5,375,179 A | 12/1994 | Shaar et al. |
| 5,463,704 A | 10/1995 | Ziebol |

(Continued)

OTHER PUBLICATIONS

PCT International Search Report and The Written Opinion, dated Sep. 14, 2015; International Application No. PCT/US2014/061691; International File Date: Oct. 22, 2014.

*Primary Examiner* — Elizabeth Gitlin
(74) *Attorney, Agent, or Firm* — Bracewell LLP; Constance G. Rhebergen; Keith R. Derrington

(57) ABSTRACT

Methods for communicatively coupling components at down-hole locations within a wellbore include introducing first and second cables through which signals are transmissible into the wellbore. Terminal ends of the cables are coarsely aligned by coupling connector housings associated with the cables within the wellbore. The terminal ends are then finely aligned by activating motors to move at least one of the terminal ends within the connector housings until a signal of sufficient strength is transmissible between the first and second cables.

20 Claims, 6 Drawing Sheets

(56) References Cited

U.S. PATENT DOCUMENTS

| | | |
|---|---|---|
| 5,590,227 A | 12/1996 | Osaka et al. |
| 5,727,099 A | 3/1998 | Harman |
| 6,102,582 A | 8/2000 | Espindola et al. |
| 6,590,658 B2 | 7/2003 | Case et al. |
| 6,963,678 B2 | 11/2005 | Wekheiser et al. |
| 6,970,627 B2 | 11/2005 | Koishi et al. |
| 6,990,267 B2 | 1/2006 | Harman et al. |
| 7,252,437 B2 | 8/2007 | Ringgenberg |
| 7,450,812 B2 | 11/2008 | Romo et al. |
| 7,744,292 B2 | 6/2010 | Stoesz |
| 7,813,600 B1 | 10/2010 | Safrani et al. |
| 7,900,698 B2 | 3/2011 | Stoesz |
| 2005/0211441 A1 | 9/2005 | Vold et al. |
| 2007/0010119 A1 | 1/2007 | Hall et al. |
| 2007/0018070 A1 | 1/2007 | Dames |
| 2011/0174500 A1* | 7/2011 | Davies ................. E21B 17/023 166/378 |

\* cited by examiner

METHOD AND APPARATUS FOR DOWN-HOLE ALIGNMENT OF OPTIC FIBERS

BACKGROUND OF THE INVENTION

1. Field of the Invention

The present invention relates to establishing communicative connections in a down-hole environment. In particular, the invention relates to systems and methods for aligning two terminal ends of first and second cables down-hole such that a signal is transmissible between the two cables.

2. Description of the Related Art

Often instruments and tools are positioned at down-hole locations within hydrocarbon producing wells to detect well conditions and control the operation of the well. Communication systems are provided so that an operator at a surface location can receive information from down-hole sensors and issue commands to down-hole tools. Some communication systems operate by generating and detecting pressure fluctuations in a fluid column extending into a well. These systems are often slow and unreliable. Other communication systems employ metallic wire conductors to transmit data signals and electric power. These systems are often susceptible to EMI noise and damaging effects of moisture and temperature conditions in a well. In many instances, optical fibers offer significant advantages over both metallic conductors and fluid-based communication systems. Data transmission rates through optical fibers are relatively high and communications through optical fibers are not as influenced by environmental conditions. Accordingly, fiber optic cable is increasingly employed in down-hole applications.

The use of optical fibers, however, does present some difficulties. For instance, the small diameter of typical optic fibers makes precise alignment increasingly critical when establishing connections down-hole. The total diameter of a typical single-mode optical cable may be about 400µ (microns), while a glass core of the fiber, through which optic signals are transmitted, may have a diameter of only about 8µ. The typical manufacturing tolerances of the materials used for components in a down-hole environment may be larger than the diameter of a of a fiber optic core. Thus, many typical mechanical mating techniques used for establishing down-hole connections may prove ineffective for fiber optics.

SUMMARY OF THE INVENTION

Described herein are systems and methods for establishing communicative connections between cables in a down-hole environment. Terminal ends of the cables are finely aligned down-hole such that communication of signals between the cables is permitted, and the alignment of the cables is maintained or corrected over the life cables.

According to one aspect of the invention, a method of establishing communication between wellbore components includes introducing a first cable to a down-hole location within a wellbore. The first cable includes a first connector housing and a first core through which signals are transmissible. The first core extends into the first connector housing defining a first terminal end therein. A second cable is introduced to the down-hole location. The second cable includes a second connector housing and a second core through which signals are transmissible. The second core extends into the second connector housing defining a second terminal end therein. A first motor is provided to the down-hole location such that the first motor is operatively associated with the first terminal end for selectively moving the first terminal end with respect to the first connector housing. The method further includes coupling the first connector housing to the second connector housing such that relative motion between the first and second connector housings is restricted and the first and second terminal ends are in a coarsely aligned arrangement. The first motor is activated to move the first terminal end with respect to the first connector housing at the down-hole location to arrange the first and second terminal ends in a finely aligned arrangement wherein signals are transmissible between the first and second cores.

In some embodiments, the method further includes powering down the first motor to maintain a position of the first terminal end within the first connector housing and subsequently transmitting a signal between the first and second cores. In some embodiments, the method includes transmitting a signal between the first and second cores, determining that a strength of the signal is insufficient, and repeating the steps of activating the first motor and transmitting a signal until determining that the strength of the signal is sufficient. In some embodiments the first motor is powered down subsequent to activating the first motor and prior to transmitting the signal.

In some embodiments, the method further includes providing a second motor to the down-hole location such that the first and second motors are operatively associated with the first terminal end for moving the first terminal end in orthogonal directions with respect to the first connector housing. In some embodiments, the orthogonal directions are lateral directions with respect to the first and second cores. In some embodiments, the method further includes providing a third motor to the down-hole location such that the third motor is operatively associated with the first terminal end for moving the first terminal end in a longitudinal direction with respect to the first and second cores. In some embodiments, the third motor is activated to move the first terminal end in the longitudinal direction to move the first terminal end into abutment with the second terminal end.

In some embodiments, the method includes coupling one of the first and second cables to a down-hole tool and coupling the other of the first and second cables to a controller such that signals are transmissible between the down-hole tool and the controller through the first and second cables. In some embodiments, the method further includes transmitting an optical signal between the first and second cores.

According to another aspect of the invention, a method of completing a wellbore includes installing a lower completion in a wellbore that includes at least one down-hole tool operable to produce a signal and at least one first cable coupled to the at least one down-hole tool for receiving the signal. The at least one first cable extends to a first connector housing at a down-hole location. A second cable is introduced to the down-hole location. The second cable includes a second connector housing and a second terminal end disposed within the second connector housing. At least one motor is introduced to the down-hole location. The method includes coupling the first and second connector housings at the down-hole location and coarsely aligning the first terminal end with the second terminal end. The method further includes engaging the at least one motor with at least one of the first and second terminal ends at the down-hole location. The at least one motor is activated to move at least one of the first and second terminal ends to finely align the first and second terminal ends. The method also includes powering down the at least one motor such that a flow of power to the at least one motor is at least partially interrupted while the at least one motor is engaged with the at least one of the first and second terminal ends to maintain a finely aligned arrangement of the first and second terminal ends.

In some embodiments, the method further includes operating the at least one down-hole tool while the first and second terminal ends are maintained in the finely aligned arrangement. In some embodiments, the method further includes coupling the second cable to a controller at a surface location, wherein the controller is operable to activate the at least one motor. In some embodiments, the controller is operated to execute an algorithm to determine when the first and second terminal ends are in the finely aligned arrangement. In some embodiments, the algorithm requires the controller to evaluate a strength of a signal transmitted from the at least one down-hole tool to determine when the first and second terminal ends are in the finely aligned arrangement.

In some embodiments, the at least one down-hole tool includes a plurality of down-hole tools and the at least one first cable comprises a plurality of first cables extending between the plurality of down-hole tools and the first connector housing. In some embodiments, coarsely aligning the first terminal end with the second terminal end includes activating the at least one motor to move the second terminal end to a location within second connector housing wherein the second cable is communicatively coupled to a selected one of the plurality of first cables corresponding to a selected one of the plurality of down-hole tools.

According to another aspect of the invention, a wellbore system includes a first cable having a first terminal end and a first connector housing. The first connector housing is disposed at a down-hole location within the wellbore and the first terminal end is disposed within the first connector housing. The system further includes a second cable having a second terminal end and a second connector housing. The second connector housing is operable to engage the first connector housing such that relative motion between the first and second connector housings is restricted, and the second terminal end is disposed within the second connector housing. The system further includes at least one motor operatively coupled to at least one of the first and second terminal ends and selectively operable to move the one of the first and second terminal ends with respect to the first and second connector housings when the first and second connector housings are engaged.

In some embodiments, the at least one motor is a piezoelectric motor including a piezoelectric actuator, and in some embodiments, the at least one motor is coupled to at least one of the first and second connector housings.

BRIEF DESCRIPTION OF THE DRAWINGS

So that the manner in which the above-recited features, aspects and advantages of the invention, as well as others that will become apparent, are attained and can be understood in detail, a more particular description of the invention briefly summarized above may be had by reference to the embodiments thereof that are illustrated in the drawings that form a part of this specification. It is to be noted, however, that the appended drawings illustrate only preferred embodiments of the invention and are, therefore, not to be considered limiting of the invention's scope, for the invention may admit to other equally effective embodiments.

DETAILED DESCRIPTION OF THE EXEMPLARY EMBODIMENTS

Figure 1:
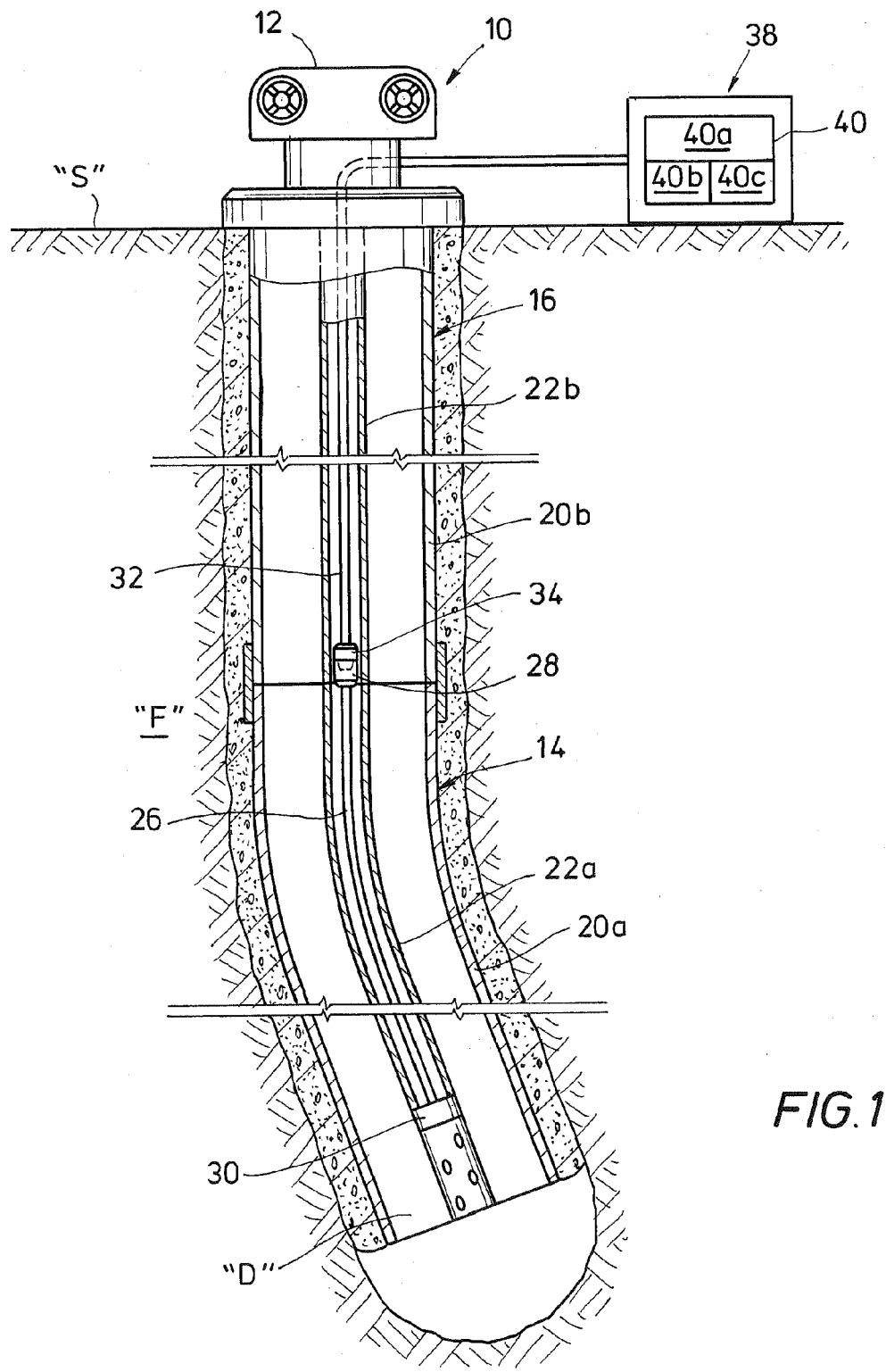
FIG. 1 is a schematic cross-sectional view of a wellbore with first and second cables coupled to one another to establish communication between a lower completion and an upper completion in the wellbore in accordance with an example embodiment of the present invention.

Shown in side sectional view in FIG. 1 is one example embodiment of wellbore 10 extending through subterranean formation "F." Wellhead 12 is disposed at an upper end of wellbore 10 at surface location "S," and provides pressure control for the production of hydrocarbons or other fluids from wellbore 10. As depicted in FIG. 1, surface location "S" is a terrestrial location, and in other alternative embodiments (not shown), surface location "S" is a subsea location.

Wellbore 10 is completed with lower completion 14 and upper completion 16 to support the production of fluids from wellbore 10. Each of lower completion 14 and upper completion 16 includes a respective casing string 20a, 20b and a respective production tubing string 22a, 22b. In alternate embodiments (not shown), lower and upper completions 14, 16 include any of the down-hole tubulars and equipment typically enabling safe and/or efficient production from wellbore 10 such as filtering systems, inflatable packers, inflow control valves, measurement and control systems. In still other embodiments (not shown) upper and lower completions 14, 16 are provided that do not include a casing string and/or a production tubing string. Lower and upper completions 14, 16 are distinct assemblies readily installed in wellbore 10 at distinct or different times, e.g., one after the other.

Lower completion 14 includes first cable 26 extending between first connector housing 28 at an upper end thereof and down-hole tool 30 at a lower end thereof. Down-hole tool 30 is selectively operable to produce a signal, and is coupled to first cable 26 such that down-hole tool 30 receives and/or transmits signals through first cable 26. In the example embodiment depicted in FIG. 1, down-hole tool 30 includes a sensor for detecting physical parameters such as the temperature, pressure, flow rate, depth, status of other down-hole equipment (not shown), natural radiation of the surrounding subterranean formation "F," and/or other measurement sensors. In other embodiments (not shown), down-hole tool 30 is a mechanical actuator able to perform operations at down-hole location "D" in wellbore 10, such as opening and closing of valves, placing equipment or cutting down-hole tubulars. Down-hole location "D" described herein extends to all areas within wellbore 10 below surface location "S."

Upper completion 16 includes second cable 32 extending between second connector housing 34 at a lower end thereof and controller 38 at an upper end thereof. Controller 38 is coupled to second cable 32 such that controller 38 receives and/or transmits signals through second cable 32. First and second connector housings 28, 34 are in a coupled configuration with respect to one another such that controller 38 is operably coupled to down-hole tool 30 through first and second cables 26, 32 as described in greater detail below.

Controller 38 includes computer 40 having processor 40a, memory 40b and input/output device 40c. Processor 40a executes software commands stored in memory 40b, and displays results on input/output device 40c. In some embodiments, an algorithm is stored in memory 40b for determining when first and second cables 26, 32 are in a finely aligned arrangement as described in greater detail below. Processor 40a is also operable to receive instructions from an operator through input/output device 40c.

Figure 2:
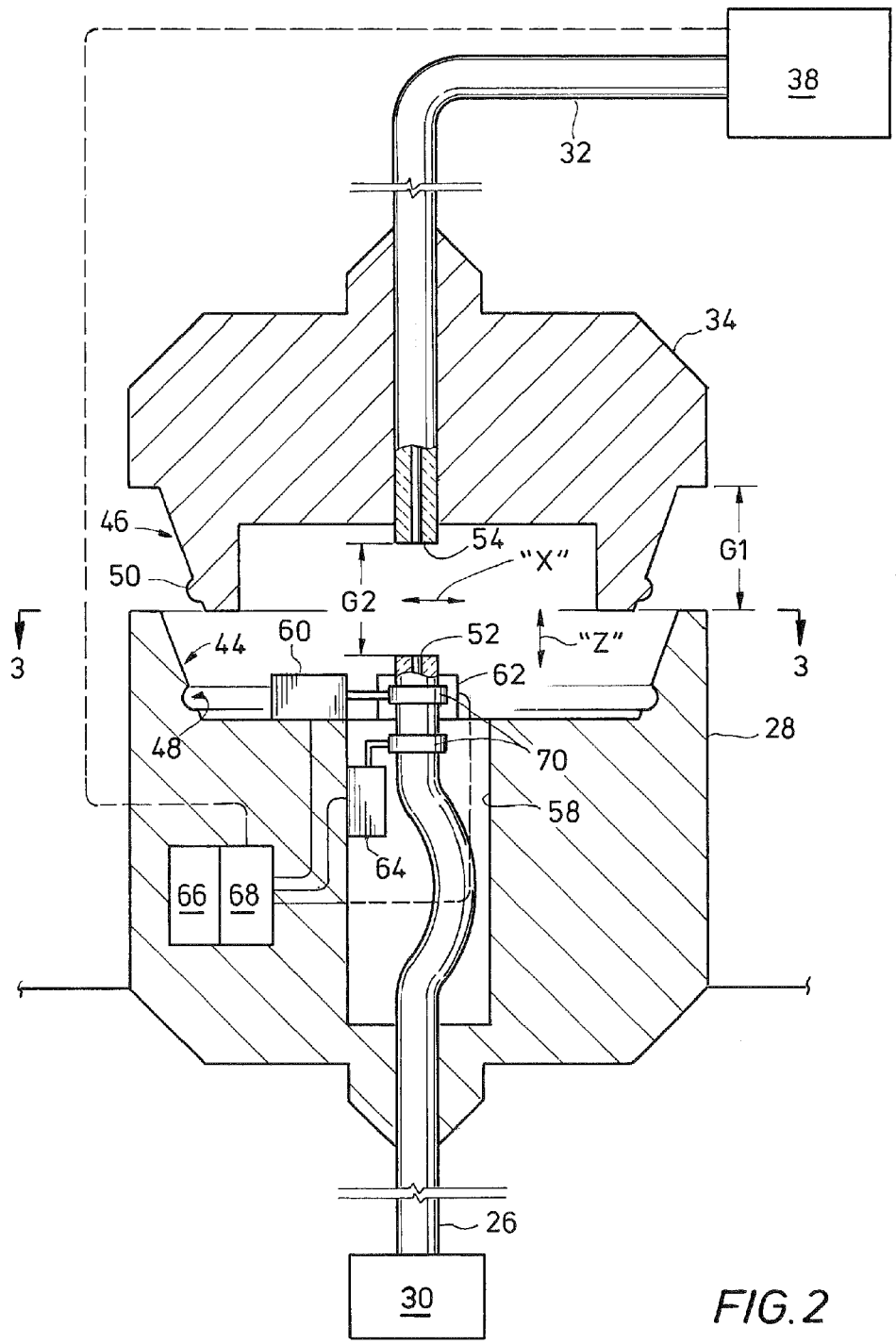
FIG. 2 is an enlarged cross-sectional view of first and second connector housings of the cables of FIG. 1 in a separated configuration wherein each of the first and second connector housings includes a terminal end of one of the cables.

Referring now to FIG. 2, first and second connector housings 28, 34 are depicted in a decoupled arrangement. First connector 28 includes first mating surface 44 thereon for engaging second mating surface 46 on second connector housing 34. First mating surface 44 defines a socket for receiving a protruding pin defined by second mating surface 46 such that first and second connectors 28, 34 define a stab-in connection arrangement. First and second mating surfaces 44, 46 each have respective locking formations 48, 50 to prevent withdrawal of first mating surface 44 from second mating surface 46 and to discourage or restrict relative motion between first and second connector housings 28, 34 once coupled together. In other embodiments (not shown), first and second mating surfaces 44, 46 define threaded, twistlock and other connection arrangements generally known in the art. In the example embodiment of FIG. 2, first longitudinal gap "G1" is defined between mating surfaces 44, 46 in the decoupled arrangement.

First and second cables 26, 32 include respective first and second terminal ends 52, 54 disposed within first and second connector housings 28, 34. First terminal end 52 is relatively movable with respect to first connector housing 28 within cavity 58 defined within first connector housing 28. First terminal end 52 is supported such that cable 26 bends or curves within cavity 58, thereby providing slack in cable 26 to support various movements of first terminal end 52. Second terminal end 54 is relatively stationary with respect to second connector housing 34. Second longitudinal gap "G2" is defined between first and second terminal ends 52 when first and second connector housings 28, 34 are in the decoupled arrangement depicted in FIG. 2. Second longitudinal gap "G2" is larger than first longitudinal gap "G1" such that a clearance or third longitudinal gap "G3" (see FIG. 4A) is provided between terminal ends 52, 54 when first and second connector housings 28, 34 are moved to a coupled configuration (FIG. 1). In some other embodiments (not shown), a relatively movable terminal end is disposed in second connector housing 34 while a relatively stationary terminal end is disposed in first connector housing 28, and in some other embodiments (not shown) movable terminal ends are disposed in both first and second connector housings 28, 34.

In the example embodiment depicted in FIG. 2, relatively movable first terminal end 52 is operatively associated with first, second and third motors 60, 62 and 64. Motors 60, 62, 64 are coupled to first terminal end 52 such that each of motors 60, 62 and 64 is selectively operable to drive first terminal end 52 in an orthogonal direction relative to first connector housing 28. First motor 62 is selectively operable to move first terminal end 52 in a first direction as indicated by arrows "X," and second and third motors 62, 64 are selectively operable to move first terminal end 52 in respective second and third directions as indicated arrows "Y" (FIG. 3) and "Z." Each of motors 60, 62 and 64 is coupled to power source 66 and motor control module 68, which is in communication with controller 38 through a wired or wireless connection. Motor control module 68 is operable to receive instructions from controller 38 and issue appropriate commands to motors 60, 62, 64 to activate the motors. In some embodiments, controller 38 is operable to selectively engage and disengage motors 60, 62, 64 from power source 66. In some embodiments, power source 66 is a battery disposed at down-hole location "D" within first connector housing 28 as depicted in FIG. 2. In other embodiments (not shown) power source 66 and motor control module 68 are disposed at surface location "S" and coupled to motors 60, 62, 64 through second cable 32, for example.

In some embodiments, motors 60, 62 and 64 are commercially available piezoelectric motors such as the "Squiggle" micro motors available from New Scale Technologies, Inc. having an office in Victor, New York. These piezoelectric motors 60, 62 and 64 operate by providing power to several piezoelectric ceramic actuators arranged to drive a threaded nut through a threaded screw. This arrangement provides for nanometer resolution, zero-backlash and positional stability when motors 60, 62 and 64 are powered down or disconnected from power source 66.

Figure 3:
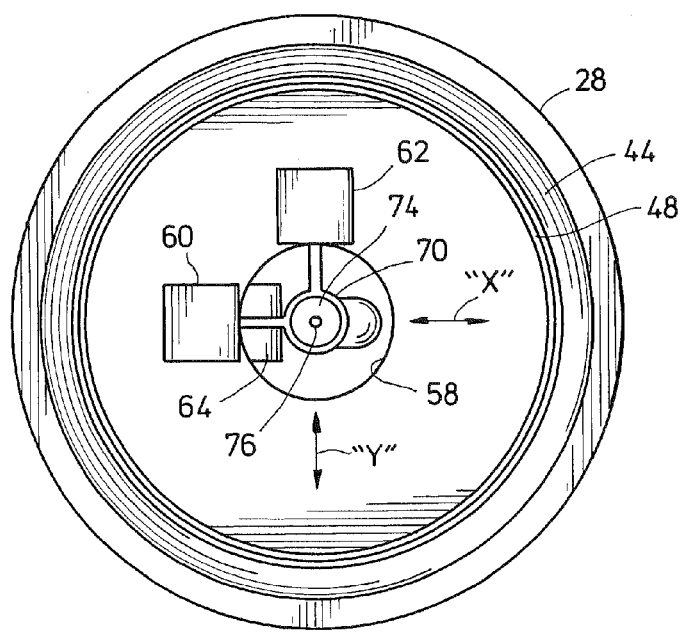
FIG. 3 is a top view of the first connector housing of FIG. 2.
Figures 4A, 4B, 4C:
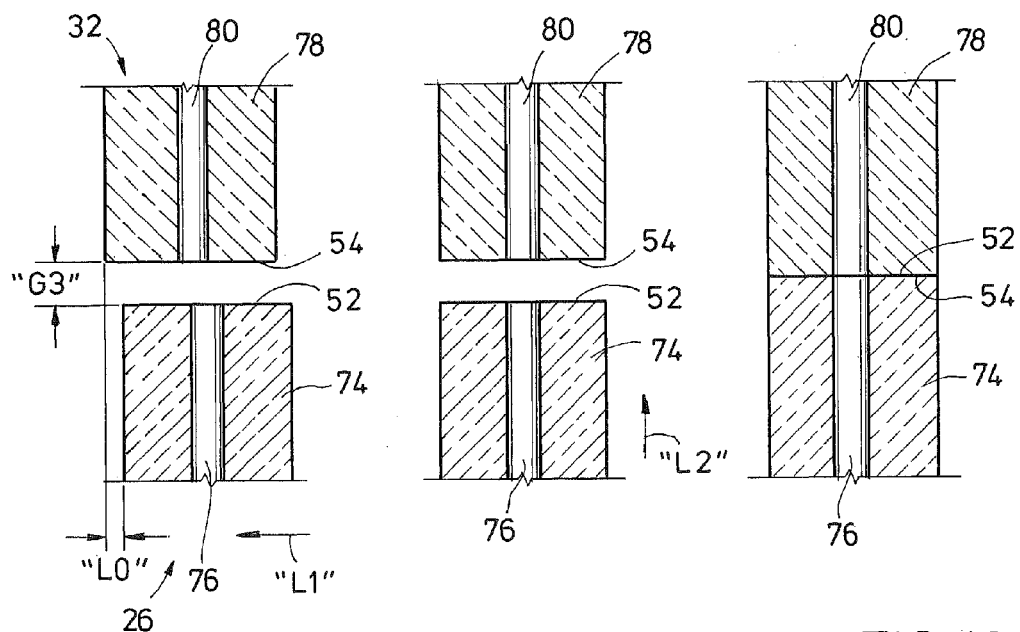
FIGS. 4A-4C are schematic views illustrating sequential steps of aligning the terminal ends of FIG. 2.
Figure 5:
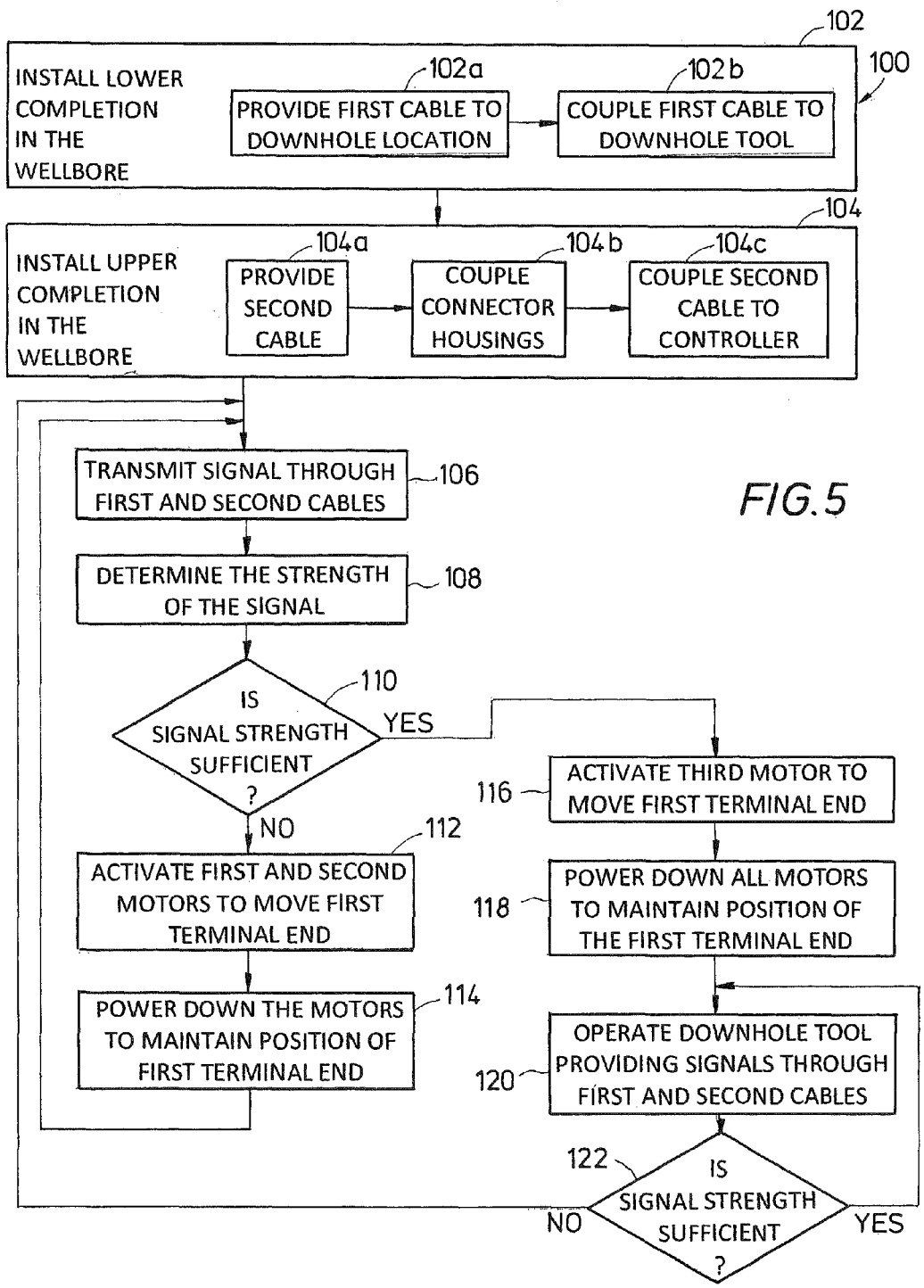
FIG. 5 is a flow diagram illustrating an example embodiment of an operational procedure in accordance with the present invention.

As depicted in FIG. 3, motors 60, 62 and 64 are coupled to relatively movable first terminal end 52 by guide rings 70 extending around outer jacket 74 of first cable 26. In other embodiments (not shown), motors 60, 62, 64 are coupled directly to first terminal end 52 by an adhesive or weld. In the example embodiment of FIG. 3, outer jacket 74 is constructed of a flexible polyurethane material surrounding first core 76 of first cable 26. First core 76 is constructed of silica or glass such that optical signals are transmissible therethrough, and first core 76 has a diameter of 8 to 10 microns. As one skilled in the art will appreciate, other intervening layers such as cladding and buffer layers (not shown) are provided between core and outer jacket layers in fiber optic cables appropriate for use in first connector housing 28. Second cable 32 is constructed in a manner similar to first cable 26 with outer jacket 78 and second core 80 (FIGS. 4A-4C). In other embodiments (not shown), first and second cables are provided with a copper or other metallic cores through which electrical or other types of signals are transmissible.

The flexibility of outer jacket 74 permits each of motors 60, 62 and 64 to apply a force to first terminal end 52 of first cable 26, and thereby selectively move first core 76, without disrupting the connection between first terminal end 52 and other motors 60, 62, 64. In other embodiments (not shown) motors 60, 62, 64 are mounted for translation within first connector housing 28 such that first cable 26 is not unduly stressed by activation of motors 60, 62, 64. For example, in some embodiments, second motor 62 is mounted for translation in the direction of arrows "X" such that activation of first motor 60 induces first terminal end 52 and second motor 62 to translate in the direction of arrows "X." First motor 60 is similarly mounted for translation in the direction of arrows "Y."

In one example embodiment of operational procedure 100, as described with reference to FIGS. 4A-4C and FIG. 5, lower completion 14 (FIG. 1) is installed in wellbore 10 (step 102). Installation of lower completion 14 includes providing first cable 26 and first connector housing 28 to down-hole location "D" within wellbore 10 (step 102a), and also coupling first cable 26 to down-hole tool 30 (step 102b). In some embodiments, lower completion 14 is installed individually, e.g, prior to installation of upper completion 16, and in other embodiments, lower completion 14 is installed with upper completion 16 and upper completion 16 is removed or partially removed.

Subsequent to installing lower completion 14, upper completion 16 is installed in wellbore 10 (step 104). Installation of upper completion 16 includes providing second cable 32 with second connector housing 34 to down-hole location "D" (step 104a) coupling first and second connector housings 28, 34 to one another by engaging the respective first and second mating surfaces 44, 46 (FIG. 2) with one another (step 104b), and coupling second cable 32 to controller 38 (step 104c).

Due in part to manufacturing tolerances of first and second connector housings 28, 34, coupling first and second connector housings 28, 34 to one another provides a coarse alignment of terminal ends 52, 54 of first and second cables 26, 32 as illustrated in FIG. 4A. A longitudinal gap "G3" is defined between terminal ends 52, 54, which in some embodiments is less than about 125µ (approximately 0.005 inches). Longitudinal gap "G3" is sufficiently small that optical signals are transmissible therethrough between first and second cores 76, 80. A lateral offset "L0" is also defined between first and second terminal ends 52, 54 in the coarsely aligned arrangement. In general, a larger lateral offset results in a lower signal strength when a given signal is transmitted between first and second cores 76, 80. With terminal ends 52, 54 coarsely aligned by first and second connector housings 28, 34, a signal is transmitted from down-hole tool 30 to controller 38 through first and second cables 26, 32 (step 106).

The strength of the signal is determined (step 108), e.g., by controller 38. In some instances, lateral offset "L0" is sufficiently large such that a signal transmitted from down-hole tool 30 does not reach controller 38. The strength of the signal in these instances, for some embodiments, is determined to be zero. In other instances, lateral offset "L0" is sufficiently small that signals are transmissible between first and second cores 76, 80, and the strength of the signals is determined on an appropriate scale. Next, a determination is made as to whether or not the strength of the signal is sufficient (decision 110). To make the determination, the signal strength is compared to values defined as predetermined acceptable limits in some embodiments, and in other embodiments, the signal strength is compared to values of previous and/or subsequent signals transmitted through first and second cables 26, 32.

If the signal strength is determined to be insufficient, first and second motors 60, 62 are activated to move first terminal end 52 (step 112). In some embodiments, an algorithm stored in memory 40b of computer 40 in controller 38 (FIG. 1) provides instructions to motor control module 68 to activate motors 60, 62. Activation of motors 60, 62 moves first terminal end 52 in a lateral direction with respect to first and second cores 76, 90 as indicated by arrow "L1" (FIG. 4A). First and second motors 60, 62 are powered down (step 114) while still engaged with first terminal end 52 to maintain the lateral position of first terminal end 52. As used herein, the term "powered down" means that a supply of power, e.g., from power source 66 to motors 60, 62, is reduced or at least partially interrupted. In some embodiments, motors 60, 62 are powered down by reducing the supply of power by about 90 percent or more with respect to an operating power supplied to activate motors 60, 62. In other embodiments, motors 60, 62 are powered down by completely interrupting the power supplied, and a holding torque of motors 60, 62 serves to maintain the lateral position of first terminal end 52. Next, a signal is again transmitted through first and second cables 26, 32 (step 106), and the signal strength is again determined (step 108). In some instances, lateral movement "L1" of first terminal end 52 places cores 76, 80 in improved alignment, and the signal strength is improved. A determination is again made as to whether or not the strength of the signal is sufficient (decision 110). The steps of transmitting a signal between first and second cables 26, 32 and activating motors 60, 62 are repeated until determining that the strength of the signal is sufficient. In some embodiments, processor 40a executes an algorithm stored in memory 40b to activate motors 60, 62, induce down-hole tool 30 to produce a signal, determine the signal strength and to determine whether the signal strength is sufficient.

If signals are transmissible between first and second cores 76, 80, and the signal strength is determined to be sufficient, first and second terminal ends 52, 54 are disposed in a finely aligned position arrangement as illustrated in FIG. 4B. Optionally, third motor 64 is activated (step 116) to move first terminal end 52 in a longitudinal direction with respect to first and second cores 76, 80 as indicated in by arrow "L2." Longitudinal motion "L2" moves first terminal end 52 into abutment with second terminal end 54 as illustrated in FIG. 4C. Each of motors 60, 62, 64 is powered down (step 118) to maintain the position of first terminal end 52 in a position with respect to second terminal end 54 in which the strength of signals transmitted through first and second cables 26, 32 is sufficient.

With first and second terminal ends 52, 54 aligned, down-hole tool 30 is operated (step 120) in normal conditions. Signals are readily transmitted through first and second cables 26, 32 between down-hole tool 30 and controller 38. After operating down-hole tool 30 in normal conditions, a determination is made at any time as to whether or not the strength of the signals transmitted in normal operation are sufficient (decision 122). If the signal strength is determined to be sufficient, operation of down-hole tool 30 is continued (step 120). If the signal strength is determined to be insufficient, the fine alignment of first and second terminal ends 52, 54 is repeated (beginning with step 106).

Figure 6:
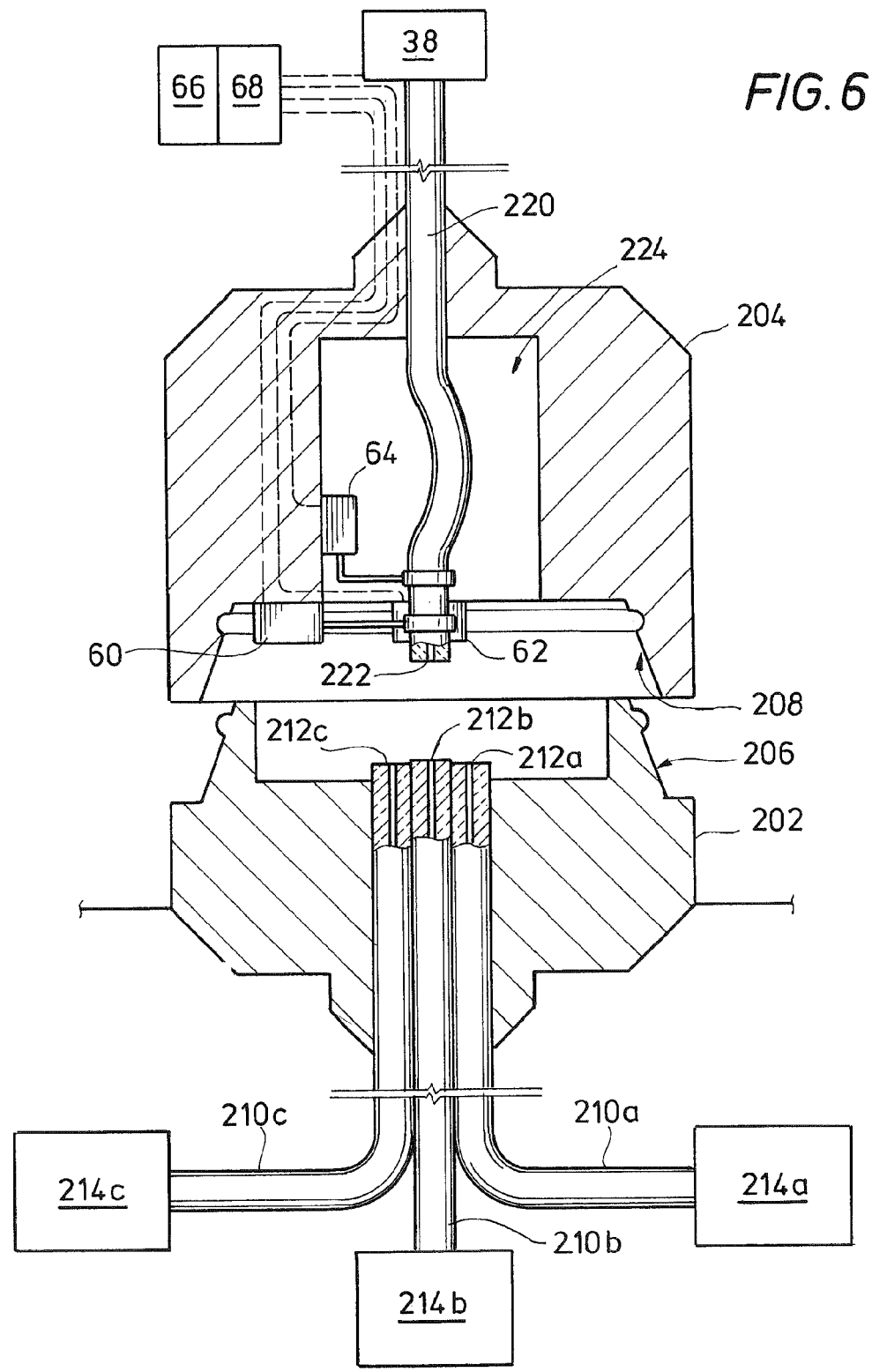
FIG. 6 is a cross-sectional view of first and second connector housings according to an alternate embodiment of the present invention in which the first connector housing includes a plurality of stationary terminal ends disposed therein and the second connector housing includes a movable terminal end that is selectively engageable with each of the plurality of stationary terminal ends.

Referring now to FIG. 6, first and second connector housings 202, 204 are depicted in a decoupled arrangement at a down-hole location "D" (FIG. 1). First connector housing 202 includes first mating surface 206 thereon for engaging second mating surface 208 on second connector housing 204. Engagement of first and second mating surfaces 206, 208 discourages or restricts relative motion between first and second connector housings 202, 204.

First cables 210a, 210b and 210c include respective first terminal ends 212a, 212b and 212c disposed in substantially stationary positions within first connector housing 202. First cables 210a, 210b, 210c extend between first terminal ends 212a, 212b, 212c and respective down-hole tools 214a, 214b, 214c, which are disposed at various positions within down-hole location "D." Down-hole tools 214a, 214b, 214c are selectively operable to produce signals transmissible through first cables 210a, 210b, 210c.

Second cable 220 extends between motor controller 38 and second terminal end 222. Second terminal end 222 is relatively movable within cavity 224 of second connector housing 204 such that second terminal end 222 is selectively engageable with each of first terminal ends 212a, 212b, 212c individually. Second terminal end 222 is operatively associated with first, second and third motors 60, 62 and 64 to drive second terminal end 22 in orthogonal directions relative to second first connector housing 204. Each motor 60, 62, 64 is coupled to power source 66 and motor control module 68, which is in communication with controller 38. In the example embodiment depicted in FIG. 6, power source 66 and motor controller are disposed at surface location "S."

Figure 7:
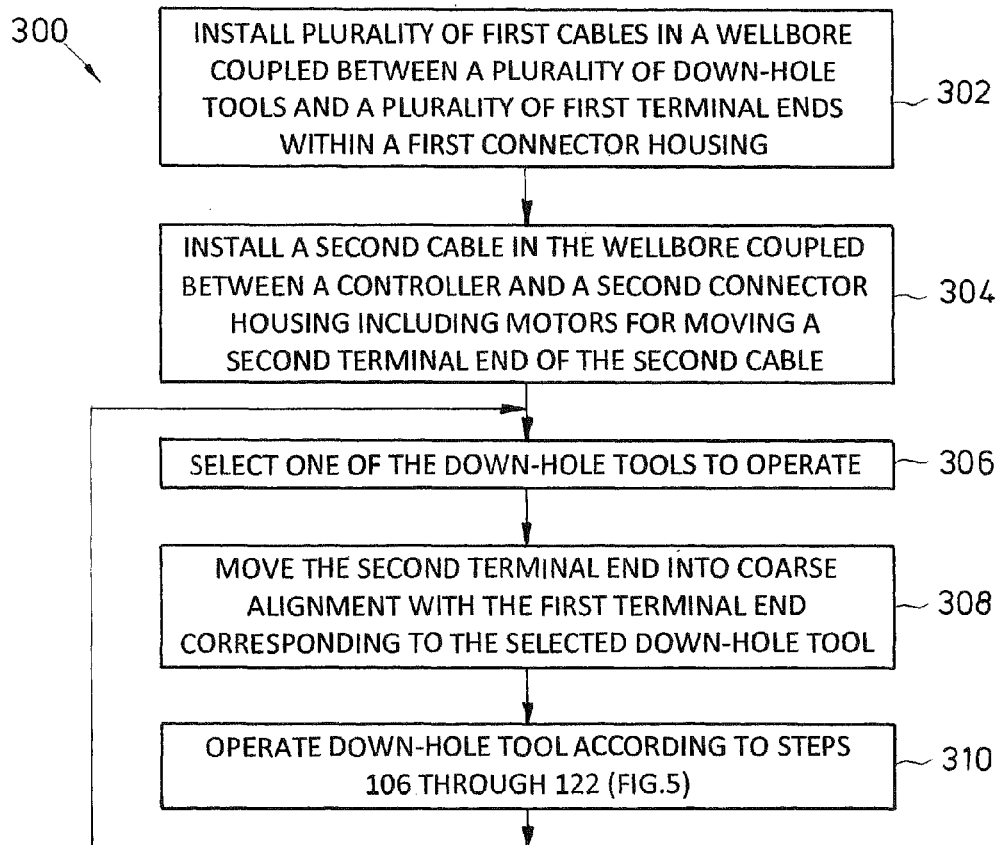
FIG. 7 is a flow diagram illustrating an example embodiment of an operational procedure in accordance with another embodiment of the present invention using the first and second connector housings of FIG. 6.

In one example embodiment of an operational procedure 300, as described with reference to FIG. 7, first cables 210a, 210b, 210c are coupled between down-hole tools 214a, 214b, 214c and first connector housing 204, and installed into wellbore 10 (FIG. 1) (step 302). Next, second cable 220 coupled between controller 38 and second connector housing 204 is installed into wellbore 10 (step 304). First and second connector housings 202, 204 are coupled to one another as second cable 220 is installed in wellbore 10.

Once first and second connector housings 202, 204 are coupled together, an operator employs input/output device 40c (FIG. 1) to select which down-hole tool 214a, 214b, 214c is needed for operation (step 306). In other embodiments, controller 38 can select which down-hole tool 214a, 214b, 214c to operate according to an algorithm. Second terminal end 222 is then moved by motors 60, 62 into coarse alignment with a particular first terminal end 212a, 212b, 212c to communicatively couple second cable 220 with a selected one of the first cables 210a, 210b, 210c corresponding to the selected down-hole tool (step 308). The position within cavity 224 to which second terminal end 222 must be moved to be coarsely aligned with each of first terminal ends 212a, 212b, 212c is stored in memory 40b (FIG. 1) of controller 38. Controller 38 accesses memory 40b to determine the appropriate location, and instructs motor control module 68 to issue the appropriate commands to motors 60, 62 to activate motors 60, 62 to move second terminal end 222 to move second terminal end 222 to the appropriate location. Once a proper coarse alignment is established, operation of the selected down-hole tool 214a, 214b, 214c proceeds (step 310) according to steps 106 through 122 (FIG. 5) to achieve a fine alignment and to operate the selected down-hole tool 214a, 214b, 214c.

Once the operation of the selected down-hole tool is complete, the process returns to step 306 and a new down-hole tool can be selected. In this manner, each of the plurality of down-hole tool 214a, 214b, 214c is operational, in turn, using only one second cable 220 extending to surface location "S" (FIG. 1).

Figure 8:
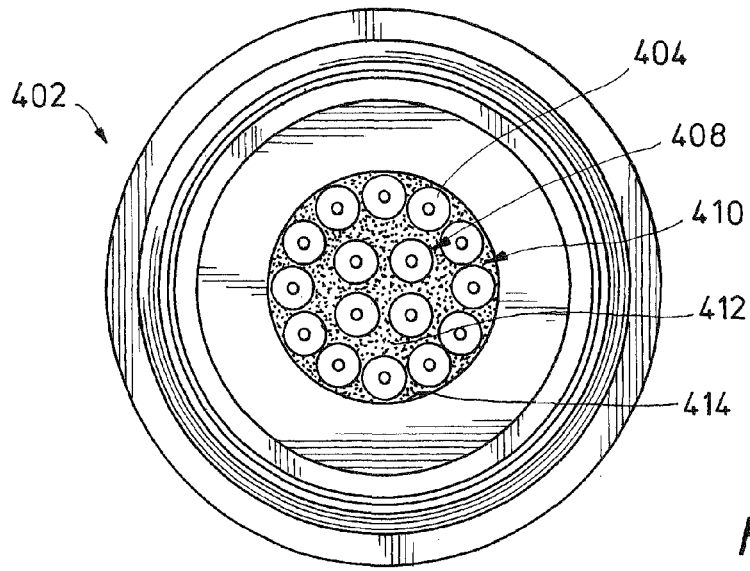
FIG. 8 is a top view of a first connector housing according to another embodiment of the present invention depicting an array of stationary first terminal ends.

Referring now to FIG. 8, first connector housing 402 is depicted including a plurality of first terminal ends 404 disposed therein in a stationary manner. First terminal ends 404 are arranged in rectangular array 408 and in a radial array 410 disposed within cavity 412 defined within first connector housing 402. Rectangular array 408 is a 2×2 array, although larger grids such as 5×5 grids are contemplated. Radial array 410 is depicted as circumscribing rectangular array 408, although in other embodiments (not shown) only one of rectangular array 408 or radial array 410 is employed in a particular first connector housing. In the embodiment depicted in FIG. 8, the stationary positions of individual first terminal ends 404 are maintained by a thermoplastic material 412 injected into cavity 414 in the spaces between first terminal ends 404. Thermoplastic material 412 may include flowable materials, such as an epoxy or similar material, that hardens or sets to such that the relative positions of each first terminal end 404 is maintained with respect to the other first terminal ends 404 and with respect to first connector housing 402.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A method of establishing communication between wellbore components, the method comprising:
introducing a first cable to a down-hole location within a wellbore, the first cable including a first connector housing and a first core through which signals are transmissible, the first core extending into the first connector housing and a defining a first terminal end therein;
introducing a second cable to the down-hole location, the second cable including a second connector housing and a second core through which signals are transmissible, the second core extending into the second connector housing and a defining a second terminal end therein;
providing a first motor to the down-hole location such that the first motor is operatively associated with the first terminal end for selectively moving the first terminal end with respect to the first connector housing;
coupling the first connector housing to the second connector housing such that relative motion between the first and second connector housings is restricted; and
activating the first motor to move the first terminal end in a radial direction with respect to the first connector housing at the down-hole location to position the first and second terminal ends so that signals are transmissible between the first and second cores.

2. The method according to claim 1, further comprising powering down the first motor to maintain a position of the first terminal end within the first connector housing and subsequently transmitting a signal between the first and second cores.

3. The method according to claim 1, further comprising:
transmitting a signal between the first and second cores;
determining that a strength of the signal is sufficient if the strength of the signal is exceeds a predetermined value; and
repeating the steps of activating the first motor and transmitting a signal until determining that the strength of the signal is sufficient.

4. The method according to claim 3, further comprising powering down the first motor subsequent to activating the first motor and prior to transmitting the signal.

5. The method according to claim 1, further comprising providing a second motor to the down-hole location such that the first and second motors are operatively associated with the first terminal end for selectively moving the first terminal end in orthogonal directions with respect to the first connector housing.

6. The method according to claim 5, wherein the orthogonal directions are lateral directions with respect to the first and second cores.

7. The method according to claim 5, further comprising providing a third motor to the down-hole location such that the third motor is operatively associated with the first terminal end for selectively moving the first terminal end in a longitudinal direction with respect to the first and second cores.

8. The method according to claim 7, further comprising activating the third motor to move the first terminal end in the longitudinal direction to move the first terminal end into abutment with the second terminal end.

9. The method according to claim 1, further comprising coupling one of the first and second cables to a down-hole tool and coupling the other of the first and second cables to a controller such that signals are transmissible between the down-hole tool and the controller through the first and second cables.

10. The method according to claim 1, further comprising transmitting an optical signal between the first and second cores.

11. A method of completing a wellbore, the method comprising;
  installing a lower completion in a down-hole wellbore, the lower completion comprising:
    at least one down-hole tool operable to produce a signal; and
    at least one first cable coupled to the at least one down-hole tool for receiving the signal, the at least one first cable extending to a first connector housing at a down-hole location and comprising a first terminal end disposed within the first connector housing;
  introducing a second cable to the down-hole location, the second cable comprising a second connector housing and a second terminal end disposed within the second connector housing;
  introducing at least one motor to the down-hole location;
  coupling the first and second connector housings at the down-hole location so that
  the first terminal end is proximate to the second terminal end;
  engaging the at least one motor with at least one of the first and second terminal ends at the down-hole location;
  activating the at least one motor to move at least one of the first and second terminal ends to align the first and second terminal ends so that a signal is transmitted across the first and second terminal ends;
  monitoring a strength of the signal being transmitted across the first and second terminal ends;
  determining when the first and second terminal ends are aligned based on the monitored strength of signal; and
  powering down the at least one motor such that a flow of power to the at least one motor is at least partially interrupted while the at least one motor is engaged with the at least one of the first and second terminal ends to maintain a finely aligned arrangement of the first and second terminal ends.

12. The method according to claim 11, further comprising operating the at least one down-hole tool while the first and second terminal ends are maintained in the finely aligned arrangement.

13. The method according to claim 11, further comprising coupling the second cable to a controller, the controller operable to activate the at least one motor.

14. The method according to claim 13, further comprising operating the controller to execute an algorithm to determine when the first and second terminal ends are in the finely aligned arrangement.

15. The method according to claim 14, wherein the algorithm requires the controller to evaluate a strength of a signal transmitted from the at least one down-hole tool to determine when the first and second terminal ends are in the finely aligned arrangement.

16. The method according to claim 11, wherein the at least one down-hole tool comprises a plurality of down-hole tools and the at least one first cable comprises a plurality of first cables extending between the plurality of down-hole tools and the first connector housing.

17. The method according to claim 16, further comprising activating the at least one motor to move the second terminal end to a location within second connector housing wherein the second cable is communicatively coupled to a selected one of the plurality of first cables corresponding to a selected one of the plurality of down-hole tools.

18. A wellbore system comprising:
  a first cable including a first terminal end and a first connector housing, wherein the first connector housing is disposed at a down-hole location within the wellbore and the first terminal end is disposed within the first connector housing;
  a second cable including a second terminal end and a second connector housing, wherein the second connector housing is operable to engage the first connector housing such that relative motion between the first and second connector housings is restricted, and wherein the second terminal end is disposed within the second connector housing; and
  at least one motor operatively coupled to at least one of the first and second terminal ends and selectively operable to move the one of the first and second terminal ends in a radial direction with respect to the first and second connector housings when the first and second connector housings are engaged.

19. The wellbore system according to claim 18, wherein the at least one motor comprises a piezoelectric motor including a piezoelectric actuator.

20. The wellbore system according to claim 18, wherein the at least one motor is coupled to at least one of the first and second connector housings.

* * * * *